United States Patent [19]

Sharp et al.

[11] 4,093,831

[45] June 6, 1978

[54] TRANSCRIBER HAVING SELECTABLE WORD REPRODUCTION RATE

[75] Inventors: Walter M. Sharp; Gary E. Bergstrom, both of Columbus, Ohio

[73] Assignee: Business Education Products, Inc., Columbus, Ohio

[21] Appl. No.: 731,462

[22] Filed: Oct. 12, 1976

[51] Int. Cl.² .................... G11B 19/20; G11B 27/22
[52] U.S. Cl. ............................. 179/100.1 VC; 360/74
[58] Field of Search ........... 179/100.1 VC, 100.1 DR; 360/74

[56] References Cited

U.S. PATENT DOCUMENTS

| | | | |
|---|---|---|---|
| 2,410,835 | 11/1946 | Montague | 179/100.1 VC |
| 2,411,501 | 11/1946 | Brubaker | 179/100.1 VC |
| 3,402,266 | 9/1968 | Winther | 179/100.1 VC |
| 3,532,835 | 10/1970 | Nakayama et al. | 179/100.1 VC |
| 3,614,336 | 10/1971 | Patey | 179/100.1 VC |
| 3,829,621 | 8/1974 | Goldman | 179/100.1 VC |
| 3,972,603 | 8/1976 | Lubinec | 179/1 VC |
| 4,000,517 | 12/1976 | Brickerd, Jr. | 179/100.1 VC |

FOREIGN PATENT DOCUMENTS 776,656  6/1957  United Kingdom ...... 179/100.1 VC

Primary Examiner—Raymond F. Cardillo, Jr.
Attorney, Agent, or Firm—Frank H. Foster

[57] ABSTRACT

The invention is a device for controlling a sound reproduction transcriber which provides alternate playback intervals and stopped intervals. The playback interval length in words and the average word reproduction rate are manually selectable by a secretary or instructor. The device meters the reproduced words during the playback interval and initiates the stopped interval at the first audio pause after the selected number of words have been played back. The required total cycle time is computed by effectively dividing the number of words played back during the playback interval by the selected average word reproduction rate. A timer, which counts the time elapsed since the playback interval was initiated, has its counted time compared to the computed total cycle time so that the stopped interval is terminated, the circuit is reset and the playback interval is again initiated upon coincidence of the computed time and the elapsed time.

16 Claims, 4 Drawing Figures

TRANSCRIBER HAVING SELECTABLE WORD REPRODUCTION RATE

BACKGROUND OF THE INVENTION

This invention relates generally to the control of sound reproduction equipment for facilitating transcription thereof and more particularly relates to a transcriber which plays back a spoken sound recording for a selected phrase length and then stops the playback for a sufficient interval to provide a selected average playback rate.

A substantial number and variety of transcription devices have been provided both for office use and for instructional purposes. Transcribers are time saving devices because they permit the author of a letter, legal brief or other writing to rapidly speak the text of a composition rather than laboriously write it out in longhand. A competent secretary is then able to type from the played recording at a convenient time. Transcribers are also useful instructional devices for both typing and stenographic training.

Few secretaries are able to type and few shorthand students are able to take shorthand as rapidly as a person is able to speak. It is therefore necessary that the playback of recorded words be periodically stopped and started since slowing down the playback speed would distort the spoken words. Conventionally this is mutually accomplished by means of a foot pedal. However, it is more convenient, efficient and productive to provide a machine which will automatically start and stop itself without requiring manual operation by the secretary or student.

Several devices have been suggested for accomplishing this. For example, in U.S. Pat. No. 2,410,835 to H. R. Montague a transcribing device is described which stops the playback at a pause in the played back sound and maintains this stopped condition for a selected amount of time. In others, such as the U.S. Pat. No. 3,532,835 to Nakayama, a playback interval is stopped at a pause and maintained stopped for a period of time equal to the time of the playback interval.

Still other patents, such as U.S. Pat. Nos. 3,829,621 and 3,614,336 show devices which are responsive to typing activity. One such device remains stopped as long as there is typewriter activity. Whenever typewriter activity ceases, the device resumes playback.

Still another type of device is exemplified by U.S. Pat. No. 3,691,313 to Kobayashi. In devices of this nature a human being must preview each tape and insert a tone or other signal to indicate the positions at which the playback interval is to be interrupted. Then, upon subsequent playback, the playback device detects this tone or other signal and upon its detection holts the playback.

The most obvious difficulty with the latter type of device is that it requires human preview and therefore is very inefficient for office or other use.

The primary difficulty with all of these prior art devices is that they do not adequately take into account the conventional primary factors used in determining the effectiveness of transcription. For example, typing speed of shorthand transcription speed are commonly quantized in terms of words per minute. The skill of the typist is usually reflected by the number of words per minute which can be accurately typed. However, none of the devices known to applicants provide a uniform, average rate of word reproduction.

Additionally, typists and stenographers are capable of typing or otherwise transcribing spoken words even during the playback interval. However, different persons are capable of remembering different phrase lengths and therefore some individuals will be more comfortable with longer playback phrase intervals while others will require shorter playback intervals. Many of the prior art devices stop the playback interval merely upon the occurrence of a pause rather independently of the ability of the operator to remember a lengthy phrase. No device is known which permits the operator to select the playback phrase length in words is most comfortable for that particular operator.

Still another problem with the prior art is the fact that none of the prior art devices take into account the fact that different persons have different speaking characteristics, some have fewer pauses than others and some speak at faster or slower rates than others and that therefore reproduced words rather than elapsed time or the occurrence of a pause should be the criterion for the playback interval length.

There is therefore a need for a transcription device which operates on the basis of those characteristics of the reproduced speech which are of significance and importance to the person transcribing the speech. More particularly, there is a need for a device which operates on the basis of the number of words played back and the average word playback rate.

SUMMARY OF THE INVENTION

The invention is an apparatus for controlling the average word reproduction rate from a recording by providing a controlled operating cycle comprising alternate playback intervals and stopped intervals. In the invention, means are provided for selecting a time rate of word reproduction and for counting the time elapsed from the beginning of a playback interval. Another circuit detects and counts the reproduced syllables during the playback interval. When the playback interval is stopped, the counted number of syllables, which is proportional to the number of words played back, is divided by the selected word reproduction rate to compute a total cycle time. When the elapsed time equals the computed total cycle time, control logic circuitry again initiates a new playback interval. The invention may also include means for selecting a phrase length for the playback interval and means for detecting a pause in the speech. The playback interval is halted at the first pause after the length of the played back phrase equals the selected playback phrase length.

It is the primary object of the present invention to provide improved transcription and instructional equipment.

Another object of the present invention is to provide a sound reproduction apparatus which will play back spoken words at their natural rate and frequency while providing a sufficient stopped time interval so that a selected average word reproduction rate is provided.

Another object of the present invention is to provide for the selection of a convenient and confortable playback phrase length by the operator.

Yet another object of the present invention is to provide a transcription apparatus which will operate as described upon sound recordings which require absolutely no prior preparation beyond recording of the sound signals.

Still another object of the present invention is to provide a transcription device which can provide the selected average word reproduction rate and playback phrase length regardless of the speech rate, frequency of pauses or other characteristics of the speech of the person's voice being recorded.

Further objects and features of the present invention will be apparent from the following specification and claims when considered in connection with the accompanying drawings illustrating the preferred embodiment of the invention.

Figure 1:
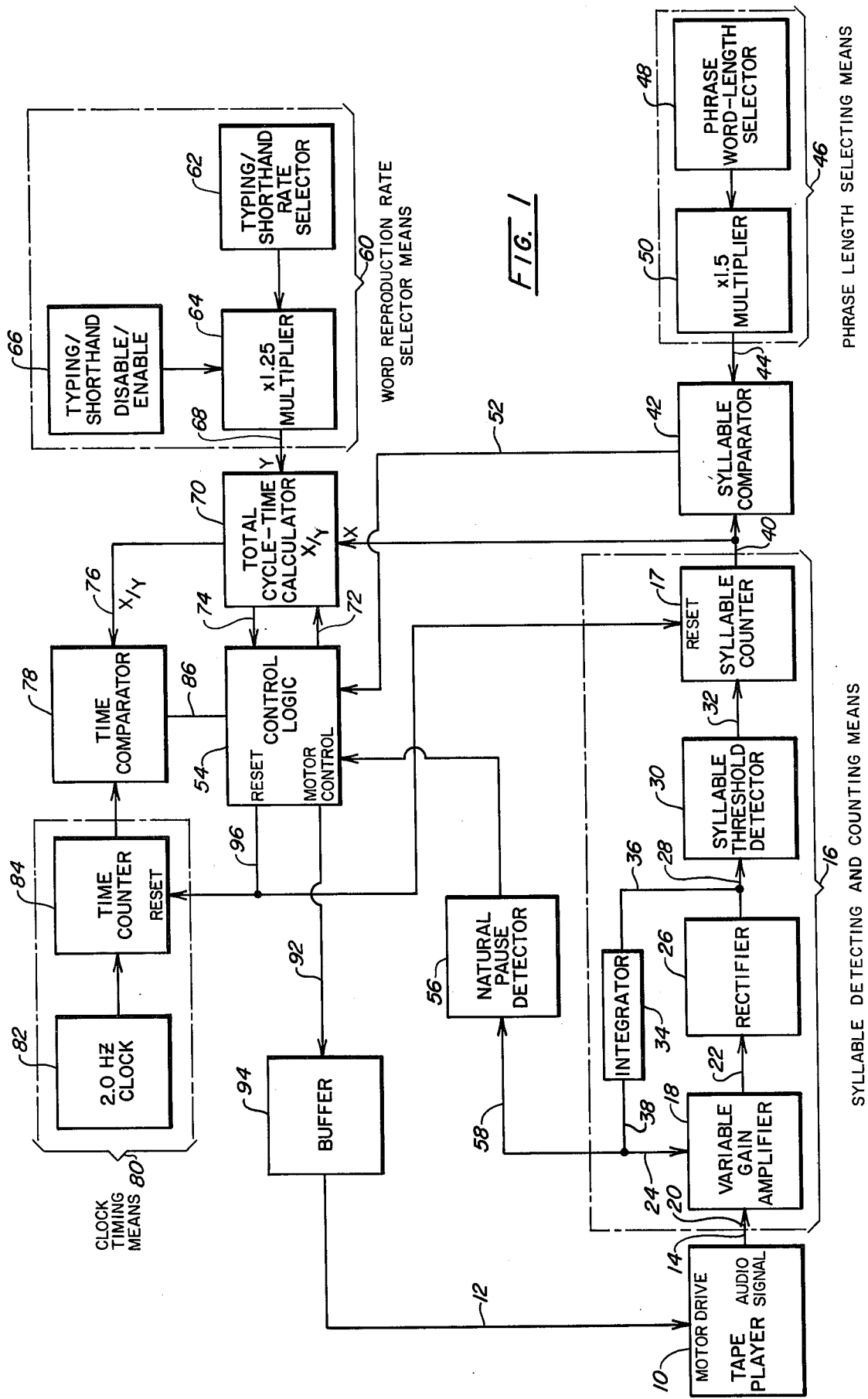
FIG. 1 is a block diagram illustrating the preferred embodiment of the invention.

In describing the preferred embodiment of the invention illustrated in the drawings, specific terminology will be resorted to for the sake of clarity, however, it is not intended to be limited to the specific terms so selected and it is to be understood that each specific term includes all technical equivalents which operate in a similar manner to accomplish a similar purpose.

DETAILED DESCRIPTION

Referring now to FIG. 1, the preferred embodiment of the invention utilizes a playback means 10 such as a conventional tape player which has a drive motor and a drive motor input 12 for controlling or operating the drive motor as well as a sound pickup and output means to provide an audio signal at its output 14. Preferably, the drive motor is controlled by turning it on and off by a switching signal at the input 12. As will be subsequently described, a signal is applied to the motor drive input 12 to turn the motor drive on and off in a manner which provides an operating cycle comprising alternate playback intervals and stopped intervals.

The audio output signal at output 14 is an analog of the recorded sound and is applied to the input of a syllable detecting and counting circuit means 16. This circuit means 16 operates to detect each reproduced syllable during the playback interval and to count the reproduced syllables in its syllable counter 17.

The syllable detecting and counting circuit means 16 operates on the principal that spoken vowels have greater amplitude than spoken consonants and that each syllable contains one vowel. Consequently, by counting vowels the number of spoken syllables may be counted. The vowels are detected by rectifying the audio signal and providing some filtering thereof so that the envelope of the audio signal may be electronically monitored. Whenever the envelope level exceeds a selected intermediate threshold level, a vowel is detected and whenever the envelope level is less than the threshold level consonants are detected.

More particularly, in order to accomplish this, the reproduced audio signal is applied to a variable gain audio amplifier 18 having an audio input 20 connected to the output 14 of the sound pickup and output means and also having an audio output 22. The gain of the variable gain amplifier 18 is in varied correspondence with the signal applied to its gain control input 24. The variable gain amplifier 18 operates to substantially reduce the variations in audio signal amplitude as a person speaks louder and quieter by varying the gain inversely to the average audio amplitude by means of a negative feedback loop. Its purpose is to minimize variations in audio intensity or amplitude so that the detected audio envelope has substantially the same range of excursions regardless of the amplitude or intensity of the recorded audio signal.

The output 22 of the variable gain amplifier is applied to the input of a rectifier circuit 26 having an output 28. This output 28 is in turn applied to a syllable threshold detector 30 the output 32 of which is applied to the syllable counter 17. The syllable threshold detector 30 is a threshold detector circuit with its threshold level set intermediate the extreme boundaries of the excursions of the output of the rectifier 26. The output of the threshold detector 30 switches its state whenever the output of the rectifier 26 crosses over this threshold. In this manner, enevelope levels greater than the threshold level of the threshold detector 30 cause the output of the threshold detector 30 to switch to a first state to indicate the presence of a vowel and to a second state to indicate the presence of a consonant. Consequently, the syllable counter 17 is able to count the reproduced vowels and thereby count the reproduced syllables.

An integrator circuit 34 has its input 36 connected to the output of the rectifier 26 and its output 38 connected to the gain control input 24 of the variable gain amplifier to form the gain controlling negative feedback loop. The integrator circuit 34 operates to perform a time integration of the envelope at the output 28 of the rectifier 26 and to use the integrated output to increase the gain of the variable gain amplifier 18 in response to a decrease in the average amplitude of the output envelope of the rectifier 26 and to decrease the gain of the variable gain amplifier 18 in response to an increase in the average amplitude of the output envelope of the rectifier 26. Therefore, the gain of the variable gain amplifier 18 is automatically adjusted so that its output audio signal maintains a relatively constant, average amplitude so that the selected threshold for the threshold detector 30 will always be intermediate the maximum and minimum envelope amplitudes at the output of the rectifier 26.

The output from the syllable counter 17, which is also the output 40 from the entire syllable detecting and counting circuit means 16, is applied to a syllable comparator 42. Also applied to the syllable comparator 42 is the output 44 of a playback phrase length selecting circuit means 46. Three conventional rotary switches form a phrase length selector 48 for selecting the desired phrase length in words. Each of these three switches are conventional rotary switches having 10 states labelled 0 through 9, each providing a four bit binary coded output for its respective digit.

Because the playback phrase length is selected in words, rather than syllables the output of the phrase length selector 48 is applied to a digital multiplier circuit 50 for multiplying this selected word length by a factor of 1.5 to convert it to syllables. This conversion factor was derived from the fact that in stenography, a word is statistically defined as 1.4 syllables. However, in order to simplify the digital circuitry, this is approximated by the factor of 1.5. Therefore, on the average a word contains 1 and ½ syllables.

The syllable comparator 42 continuously compares the digital BCD number representing the selected phrase length in syllables to the running digital count in the syllable counter 17. Whenever the syllable comparator 42 detects that the syllable count in counter 17 is equal to or greater than the selected phrase length at the output 44 of the phrase length selecting means 46, the syllable comparator 42 switches its output state. The output 52 of the syllable comparator 42 is applied to a control logic circuit 54 for signalling this coincidence.

A natural pause detector circuit means 56 has its input 58 connected to the syllable detecting and counting means 16 and its output connected to the control logic means 54. More particularly, the input of the natural pause detector 56 is connected to the output of the integrator circuit 34 and operates to signal the absence of any substantial sound signal for a significant length of time.

Figure 2:
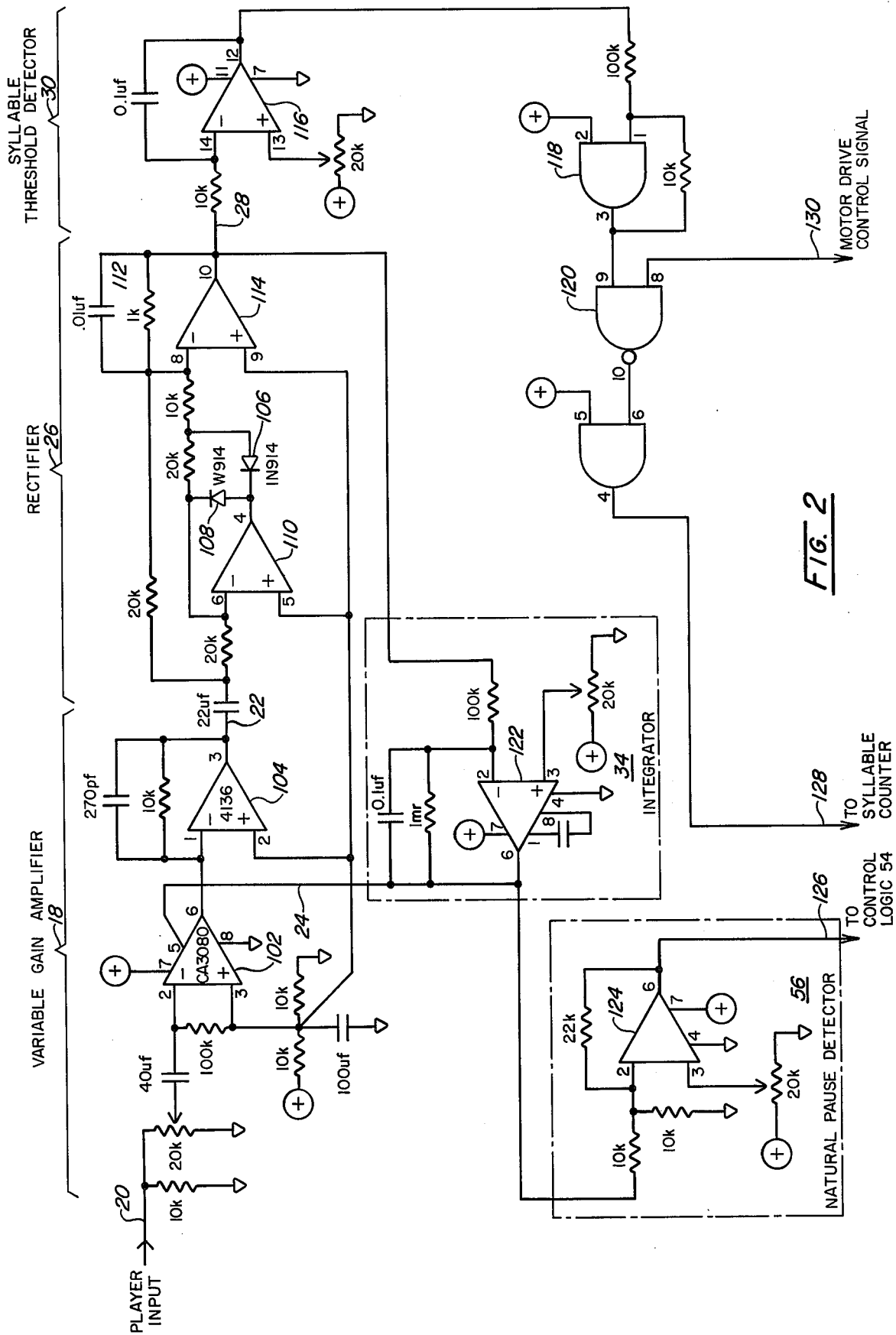
FIGS. 2–4 are skematic detailed diagrams illustrating the preferred embodiment of the invention.
Figure 3:
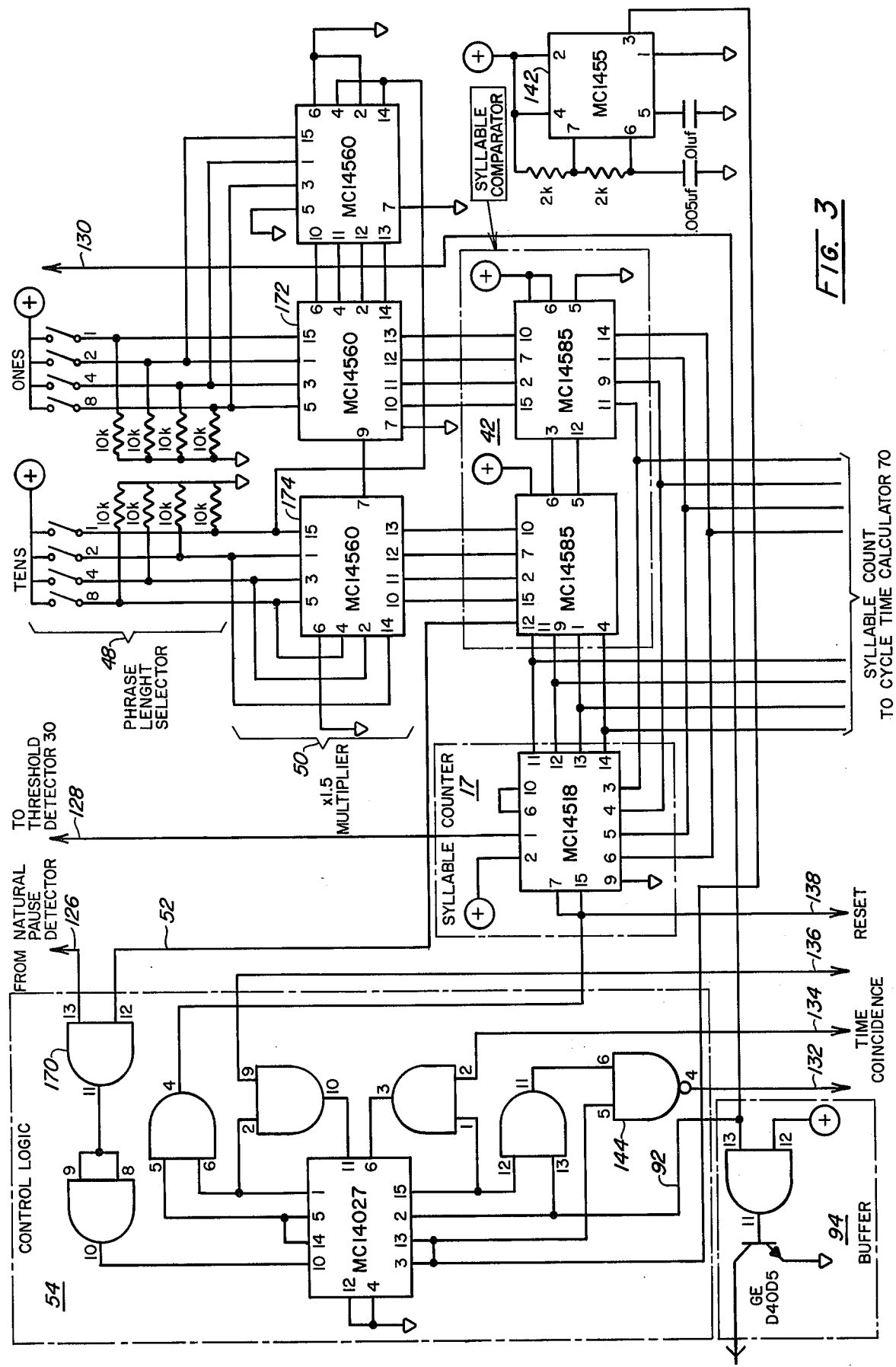
Figure 4:
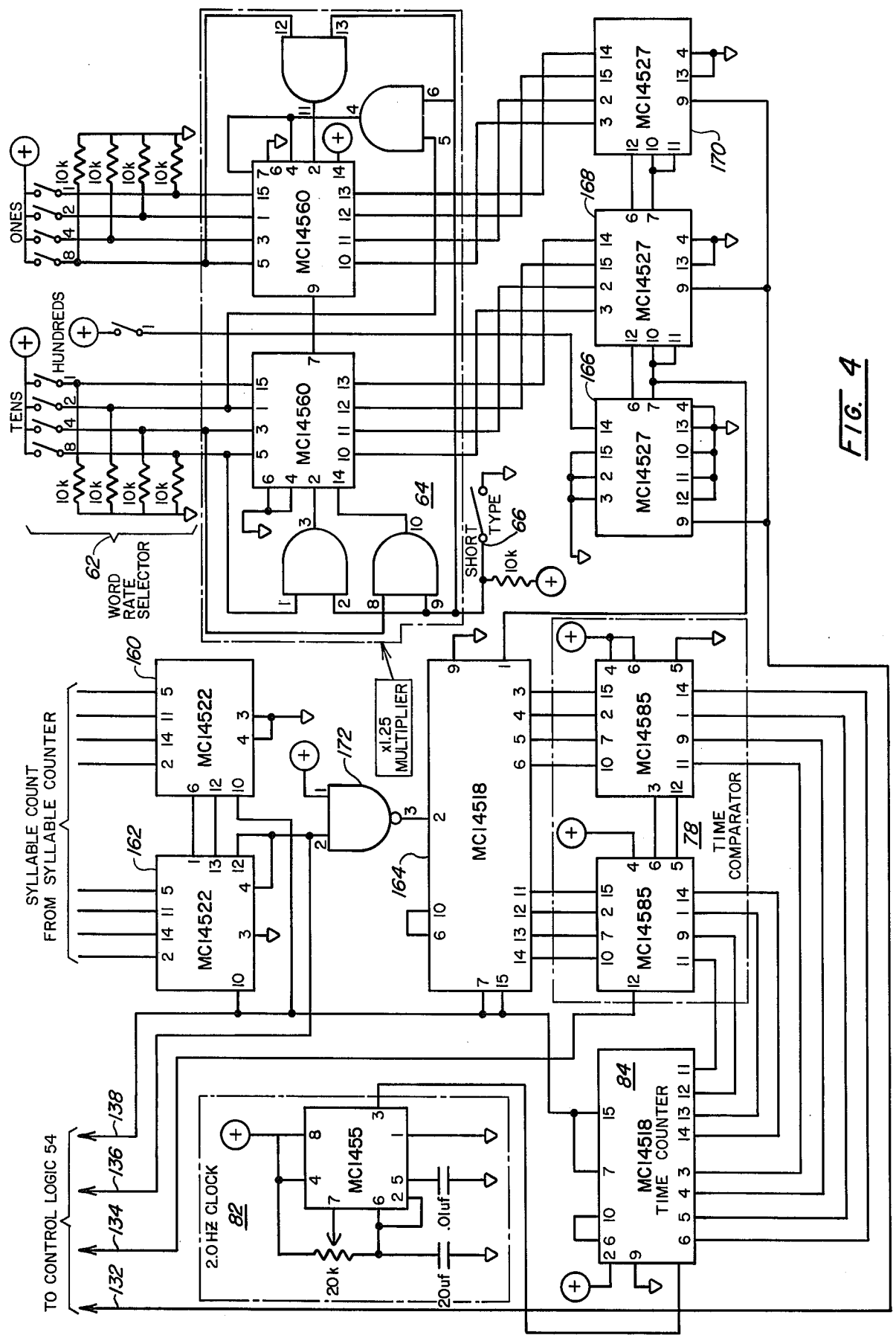

As indicated in more detail in FIGS. 2-4, the natural pause detector circuit means 56 is a threshold detector circuit with its threshold set substantially at zero. It switches its output state after the output of the integrator 34 has gone to its extreme excursion or saturation as a result of a significant pause in the speech and the consequent absence of an output from the rectifier 26. The output signal from the natural pause detector 56 is used by the control logic 54 to terminate the playback interval at the first natural pause which occurs after the syllable count of played back syllables becomes at least equal to the selected phrase length. This assures that the playback interval will not end in the middle of a word and consequently cause all or part of such a word to be inaudible.

A word reproduction rate selector means 60 has a typing/shorthand speed selector 62 consisting of two conventional rotary switches of the same type used in connection with the phrase length selector 48. These rotary switches are used by the operator for manually selecting the average word reproduction rate which is desired. This rate normally would correspond to the typing speed or shorthand speed commensurate with the skill of the operator.

The digital output of the rate selector switches 62 is applied to the multiplier circuit 64 for, at times multiplying the selected rate by a factor of 1.25. This multiplier circuit 64 is connected to a disable/enable switch 66. This disable/enable switch 66 is labelled type/shorthand. It is switched to its type position for selection of the typing mode of operation and in that position disables the multiplier circuit 64 so that the output 68 of the multiplier circuit 64 is identically the same as the output of the rate selector switches 62. However, when the shorthand mode is selected, the multiplier circuit 64 is enabled so that the output 68 represents the output of the rate selector 62 multiplied by a factor of 1.25 to effectively cause the speech to be reproduced at a faster rate.

Multiplication of the selected rate by 1.25 is necessary for use of the preferred embodiment of the invention for shorthand instruction. It is necessitated by the fact that words are defined differently for shorthand purposes than they are for typing purposes. For typing, a word is conventionally defined as five key depressions. However, shorthand symbols symbolize phonetic sounds and therefore silent letters are not represented. In shorthand a word is defined as 1.4 syllables which is rounded off to 1.5 for this circuit. However, by taking random samples of ordinary text and counting the syllables and the key depressions necessary to type the text, we have determined that each 1.5 syllables require, on the average, 6.25 key depressions. Therefore, in order to convert the 1.5 syllable per word standard used for stenography and as the count basis in the syllable counter 17 to the typing standard of five key depressions per word, the total cycle time must be 25% longer for typing than for shorthand. Consequently, the multiplier circuit 64 is enabled when shorthand is selected and multiplies the selected rate by 1.25 to effectively provide 25% less total cycle time for shorthand than for typing.

It might be noted that the multiplier circuit could alternatively be one which multiplies the selected word reproduction rate by 0.75 for typing and is disabled (i.e., multiplies by 1) for shorthand. This too would accomplish the attainment of 25% more time for the typing mode than for the shorthand mode because one shorthand word requires 25% more key depressions than one typing word.

A divider circuit 70 is provided which operates under the control of the control logic circuit 54 through its output 72 which initiates its computation function and input 74 which signals to the control logic circuit 54 that the computation has been completed. It has two data inputs, one connected to the output 40 of the syllable counter 17 and one connected to the output 68 of the word reproduction rate selector means 60. This divider circuit 70 calculates the total cycle time, that is the sum of the playback interval and the stopped interval, which is necessary to provide the selected word reproduction rate. This is done by dividing the total number of played back syllables during the previous playback interval by the selected word reproduction rate. As explained in more detail below in connection with the operation of the preferred embodiment of the invention, the output 76 of the divider 70 represents a total cycle time and is applied to a time comparator 78. A clock timing means 80 is also connected to the time comparator 78 and counts the time elapsed from the beginning of the preceeding playback interval. This timing means 80 comprises an oscillator 82 for providing conventional clock pulses and a conventional digital counter 84 for counting these pulses.

The time comparator 78 compares the computed total cycle time from the divider circuit 70 with the counted elapsed time. It switches the state of its output 86 to signal to the control logic circuit 54 that the elapsed time is equal to the computed time.

One output 92 of the control logic circuit 54 is connected through a buffer 94 to the motor drive input 12 of the tape player. This is to enable the control logic to turn the tape player off and on at the appropriate times. The control logic circuit 54 also has a reset output 96 which is connected to the time counter 84 and to the syllable counter 17 for resetting these counters at the end of each stopped interval.

The detailed skematic diagram of the preferred embodiment of the invention is illustrated in detail in FIGS. 2 through 4. The audio output from the sound pickup and output means of the player 10 is applied to the input 20 of the variable gain amplifier 18. The variable gain amplifier 18 comprises two cascaded, op-amp amplifier stages using op-amps 102 and 104 with the gain control input 24 applied to pin 5 of the op-amp 102.

The output of the variable gain amplifier 18 is applied to the input 22 of the rectifier 26 which includes a full wave bridge rectifier circuit including diodes 106 and 108 and op-amp 110. The output of the bridge rectifier is applied to an integrating circuit comprising integrating capacitor 112 and op-amp 114. The integrating circuit provides a time averaging or filtering of the rectified audio signal so that the envelope of the audio signal is applied at the rectifier output 28 to the syllable threshold detector 30.

The syllable threshold detector 30 is a conventional threshold detector circuit ulitizing op-amp 116. The output of the op-amp 116 is applied to a Schmitt trigger circuit formed with an AND gate 118 to sharpen the pulse shape of the output signal from the op-amp 116.

In order to eliminate the possibility that circuit noise might generate syllable counts in the syllable counter, the output of the Schmitt trigger AND gate 118 is applied to Nand gate 120. The other input to the Nand gate 120 is the motor drive control signal from the control logic circuit 5450 that pulses representing the reproducing of syllables will be applied to the syllable counter only during the playback interval when the playback motor drive is energized.

FIG. 2 further illustrates the integrator circuit 34 utilizing op-amp 122 for controlling the gain of the amplifier 18 and the natural pause detector 56 utilizing op-amp 124 for signalling to the control logic the presence of a pause, that is the absence of reproduced speech.

Referring now to FIG. 3 the control logic circuit 54 is controlled by its high frequency 50 kilohertz clock 142 which is also gated through Nand gate 144 to the MC 14527 circuits of the total cycle time calculator 70 illustrated in FIG. 4. The control logic 54 comprises two JK flip flops preferably formed on an MC 14027 integrated circuit and connected together to provide four sequential states. These four states control the operation of the preferred embodiment of the invention and are discussed in more detail in connection with the operation of the preferred embodiment.

The skematic circuit diagram of FIG. 3 and 4 is labelled to show the correspondence between the illustrated circuit elements and the functional circuit blocks illustrated in FIG. 1. In FIG. 4 the total cycle time calculator 70 is not separately labelled but comprises circuits 160, 162, 164, 166, 168 and 170, and Nand gate 172 connected as shown.

In the operation of the preferred embodiment of the invention, the operator first selects the desired word reproduction rate by appropriately positioning the word rate selector switches 62. Then with the preferred embodiment of the invention the operator also selects a comfortable playback phrase length by appropriately positioning the phrase length selector switches 48.

While the phrase length selection feature is advantageous and desirable, it is optional and alternatively the circuit of the preferred embodiment of the invention could be adapted to provide a fixed phase length. As a further alternative a playback interval of a selected time period could be provided using conventional timing circuits and techniques.

The operator then initiates circuit operation by application of power to the circuit components. The control logic circuit 54 is initialized to its first state which applies a signal to the buffer 94 and thereby energizes the playback drive motor and begins the playback interval. The 2.25 Hz clock 82 also begins running on power up and its pulses begin being counted by the time counter 84. As playback proceeds, the syllable threshold detector detects the reproduction of syllables and through lines 128 applies one pulse to the syllable counter 17 for each detected syllable. Consequently, as playback continues the syllable counter 17 continuously counts detected syllables.

When the contents of the registers of the syllable counter 17 becomes equal to the contents of the registers of integrated circuits 172 and 174 which comprise the x1.5 multiplier circuit 50, the state of output 52 of the syllable comparator 42 shifts and remains in this shifted second state so long as the contents of the syllable counter 17 equals or exceeds the contents of circuits 172 and 174.

This output from the syllable comparator 42 along with the output of the natural pause detector 56 are applied to an AND gate 170 included within the control logic 54. Therefore, as soon after the selected number of syllables are counted that the output from the natural pause detector 56 switches to signal the occurence of a pause, the control logic circuit 54 is switched to its second state by the output level switch from the AND gate 170.

When the control logic circuit 54 switches to its second state, the output 92 of the control logic 54 is switched to terminate the playback interval and initiate the stopped interval. Simultaneously the total cycle time calculator 70 is switched to perform its calculation of dividing the syllable count from the syllable counter 17 by the output from the x1.25 multiplier circuit 64. The switching of the control logic circuit 54 to its second state also stops further counting of syllables not only because playback ceases but also because the switching of the motor drive control signal prevents syllable pulses from being gated past the Nand gate 120 illustrated in FIG. 2. However, the counting of time continues uninterrupted.

After the total cycle time calculator 70 has completed its calculation, it outputs a completion signal to the control logic circuit 54. It signals to the control logic circuit 54 through line 136 that the computation is complete. The results of the computation are then applied from pins 3 through 6 and 11 through 14 of circuit 164 to the time comparator circuit 78.

The signal indicating the completion of the computation switches the control logic circuit 54 to its third state during which the computed time is compared by the time comparator 78 to the counted time accumulated in the time counter 84. When the counted time becomes coincident with the computed time, line 134 is switched to signal such coincidence to the control logic circuit 54. This coincidence switches the control logic circuit 54 to its fourth state.

The fourth state of the control logic circuit is a momentary state causing the control logic circuit to output a reset signal through line 138 to the time counter 84 and to the syllable counter 17 to reset them to a 0 count. the occurence of the fourth state also resets the four-state JK flip flops to their first state to initiate another playback interval and repeat the entire cycle.

It should be noted that the actual division performed by the total cycle time calculator in the illustrated preferred embodiment is a division of total counted syllables by words per minute. In order to convert the quotient of such a division to a total time in seconds, it is necessary to multiply the quotient by 60 seconds per minute and to divide the quotient by 1.5 syllables per word. Therefore, the quotient of the division must be multiplied by 60/1.5 which is of course 40.

Rather than going to the extra expense of adding a further circuit to multiply by a factor of 40, two very simple circuit modifications are made to effect the same result. First, only the two significant digits of the quotient are used so that in effect the decimal point is shifted two places thereby effectively multiplying the quotient by a factor of 100. Second, multiplication of the clock frequency by a factor effectively divides the quotient by the factor. Therefore the clock frequency can be multiplied by 2.5 to effectively divide the quotient by 2.5. Consequently, the quotient is effectively multiplied by 100 by the decimal place shift and divided by 2.5 by multiplying the clock frequency by 2.5 which results in a total multiplication by 100/2.5 which equals 40. This means that, if a multiplier circuit 64 were used which was enabled to multiply by 0.75 in the typing mode, then the clock frequency may be 2.5 Hz. However, in the preferred embodiment which is illustrated, the multiplier circuit 64 is disabled in the typing mode and therefore would provide the selected number of 1.5 syllable words in the typing mode. Since this is accurate for the shorthand mode but 25% too brief for the typing mode, the total cycle time interval can be extended 25% by effectively multiplying the quotient from the total cycle time calculator by 1.25. This can be effectively done by dividing the clock frequency by the same factor of 1.25. Therefore the resulting clock frequency is 2 Hz.

However, in operating and calibrating the preferred embodiment of the invention, it has been found desirable to operate the clock at about 1.8 Hz because the circuit has a tendency to occasionally miss counting a syllable. This calibration fudge factor could of course vary from one particular circuit to another and may be eliminated.

From the above it can be seen that the invention effectively begins a playback interval and counts the number of reproduced words regardless of the rate of speech or number of pauses in that speech. It continues playing back the recording until a selected number of words have been spoken. Playback is then terminated and the embodiment continues in its stopped interval until sufficient additional time has passed that a selected rate of word reproduction is obtained. The invention therefore entirely automatically tailors the playback of the recorded speech to accomodate the secretary or student utilizing the invention.

It is to be understood that while the detailed drawings and specific examples given described preferred embodiments of the invention, they are for the purposes of illustration only, that the apparatus and method of the invention is not limited to the precise details and conditions disclosed, that various changes may be made therein without departing from the spirit of the invention which is defined by the following claims.

We claim:

1. An apparatus for controlling the average word reproduction rate from a recording which is mounted to a playback means including an electrically operable drive motor and a sound pickup and output means, said apparatus providing an operating cycle comprising alternate playback intervals and stopped intervals and comprising:
   (a) means connected to said sound pickup and output means for detecting and counting syllables reproduced during a playback interval;
   (b) clock timing means for counting the elapsed time from the beginning of said cycle;
   (c) rate selector means for selecting a time rate of word reproduction;
   (d) circuit means connected to the outputs of said rate selector means and said syllable counter means for computing a total cycle time;
   (e) time comparator means connected to the outputs of said computing circuit means and said clock timing means for signalling the coincidence of the computed cycle time and the clock time; and
   (f) control logic means having a motor drive control output coupled to said drive motor and having an input connected to said time comparator means, for at times stopping said playback and for initiating playback in response to the coincidence of said elapsed time and said computed total cycle time.

2. An apparatus according to claim 1 wherein there is further provided a natural pause detector means with an input coupled to said syllable detecting and counting means for signalling the absence of a substantial sound signal and having an output connected to said control logic means and wherein said control logic stops said playback only during such an absence.

3. An apparatus for controlling the average word reproduction rate from a recording which is mounted to a playback means including an electrically operable drive motor and a sound pickup and output means, said apparatus providing a cycle comprising alternate playback intervals and stopped intervals and comprising:
   (a) means connected to said sound pickup and output means for detecting and counting syllables reproduced during a playback interval;
   (b) means for selecting a phrase length and providing an output syllable count representing the selected phrase length;
   (c) syllable comparator means connected to the outputs of said detecting and counting means and said phrase length selecting means for switching states in response to the syllable count becoming at least equal to the selected phrase length;
   (d) clock timing means for counting the elapsed time from the beginning of said cycle;
   (e) rate selector means for selecting a time rate of word reproduction;
   (f) circuit means connected to the outputs of said rate selector means and said syllable counter means for computing a cycle time by dividing said syllable count by the output of said rate selector means;
   (g) time comparator means connected to the outputs of said cycle time computing circuit means and said clock timing means for signalling the coincidence thereof;
   (h) natural pause detector means coupled to said syllable detecting and counting means for signalling the absence of a substantial sound signal; and
   (i) control logic means having outputs including a reset output connected to said syllable detecting and counting means and said clock timing means for resetting their counts and a motor drive control output connected to said drive motor and having inputs connected to the outputs of said syllable comparator means, said time comparator means and said natural pause detector means for initiating playback in response to an output signal from its reset output, for stopping said playback in response to said syllable count being at least equal to said selected phrase length and the simultaneous detection of the absence of a substantial sound signal and for generating a reset output in response to the coincidence of said elapsed time and said computed cycle time.

4. An apparatus according to claim 3 wherein said natural pause detector comprises a threshold detector having its threshold set substantial near zero.

5. An apparatus according to claim 3 wherein said phrase length selecting means comprises a manually operable switch means for providing a digital output representing the selected number of words for a played back phrase during said playback interval and an arithmetic circuit connected to the output of said switch means for providing an output representing said selected number of words increased by a constant proportionality factor to approximate the average number of syllables in said selected number of words.

6. An apparatus according to claim 5 wherein said proportionality factor is substantially 1.5.

7. An apparatus according to claim 3 wherein said clock timing means comprises an oscillator for providing clock pulses and a digital counter for counting said pulses.

8. A device according to claim 3 wherein said syllable detecting and counting means comprises:
   (a) a variable gain audio amplifier means having an audio input connected to the output of said sound pickup and output means, an audio output and a gain control input;
   (b) a rectifier circuit means having an input connected to the output of said variable gain amplifier means and having an output;
   (c) a threshold detector means having its input connected to the output of said rectifier circuit means for switching its output state in response to the output of said rectifier circuit means crossing over a selected threshold;
   (d) a digital counter means connected to the output of said threshold detector means for counting the number of times said detector output switches to one of its output states; and
   (e) an integrator circuit means having its input connected to the output of said rectifier circuit means and its output connected to the gain control input to said variable gain audio amplifier means for increasing the gain in response to a decrease in the average amplitude of the output of the rectifier circuit means and decreasing the gain in response to an increase in said average amplitude.

9. An apparatus according to claim 8 wherein:
   (a) said phrase length selecting means comprises manually operable switch means for providing a digital output representing the selected number of words for a played back phrase during said playback interval and an arithmetic circuit connected to the output of said switch means for providing an output representing said selected number of words increased by a constant proportionality factor to approximate the average number of syllables in said selected number of words;
   (b) said clock timing means comprises an oscillator for providing clock pulses and a digital counter for counting said pulses; and
   (c) said natural pause detector comprises a threshold detector having its threshold set substantially near zero.

10. An apparatus according to claim 9 wherein said proportionality factor is substantially 1.5.

11. A method for playback of a recording at a selected average word reproduction rate, said method comprising;
   (a) selecting a reproduction rate;
   (b) initiating and subsequently stopping the playback of a recording;
   (c) counting the time elapsed from said initiating of said playback;
   (d) detecting and counting the syllables reproduced during said playback
   (e) computing a total cycle time by dividing said counted syllables by said selected reproduction rate; and
   (f) reinitating said playback when said counted time substantially equals said computed time.

12. A method according to claim 11 wherein said method further comprises the step of selecting a phrase length and continuing said playback until the counted number of syllables is at least substantially equal to said selected phrase length.

13. A method according to claim 12 further comprising the step of detecting the absence of any substantial audio signal during playback and continuing said playback further until said absence is detected.

14. A method according to claim 13 wherein said phrase length selecting step more particularly comprises the selection of a phrase length in words and then the multiplication of the phrase length in words by a proportionality factor of approximately 1.5.

15. A method according to claim 14 wherein said reproduction rate is selected in words per minute and said total cycle time is effectively multiplied by a factor of approximately 40 to provide a reproduction rate in seconds.

16. A method according to claim 15 wherein said elapsed time counting is preformed by counting elapsed time intervals of substantially 0.5 seconds.

* * * * *